Feb. 2, 1954  E. E. SIVACEK  2,667,657
WINDSHIELD WIPER
Filed April 21, 1947  2 Sheets-Sheet 1
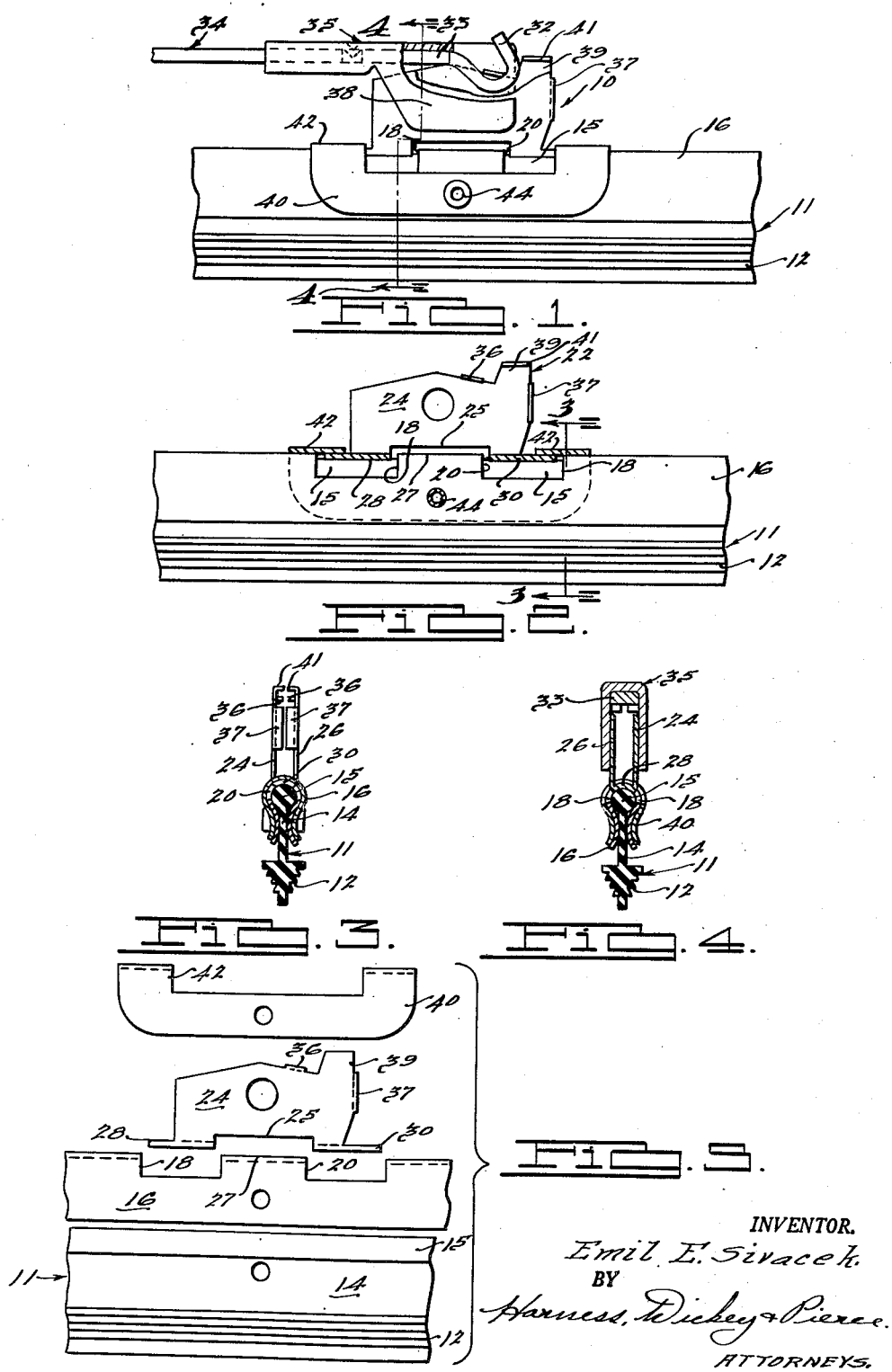
INVENTOR.
Emil E. Sivacek
BY
Harness, Dickey & Pierce
ATTORNEYS.

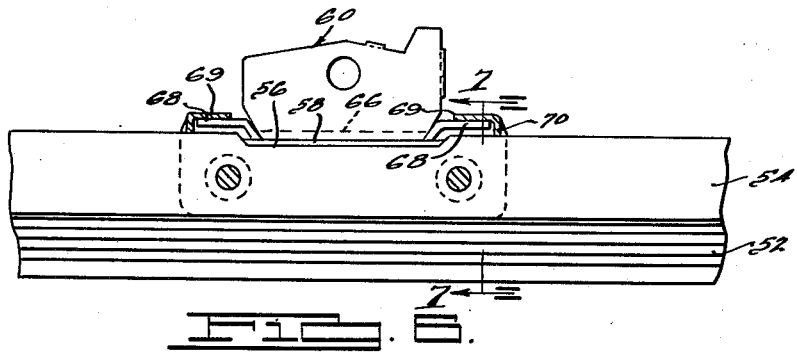
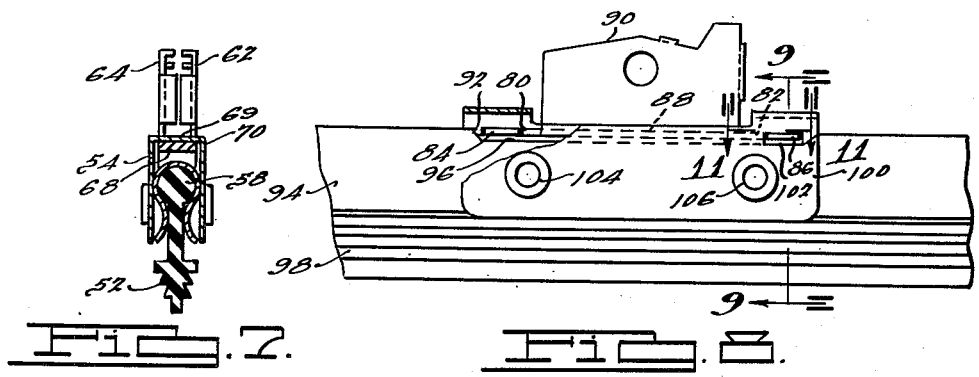
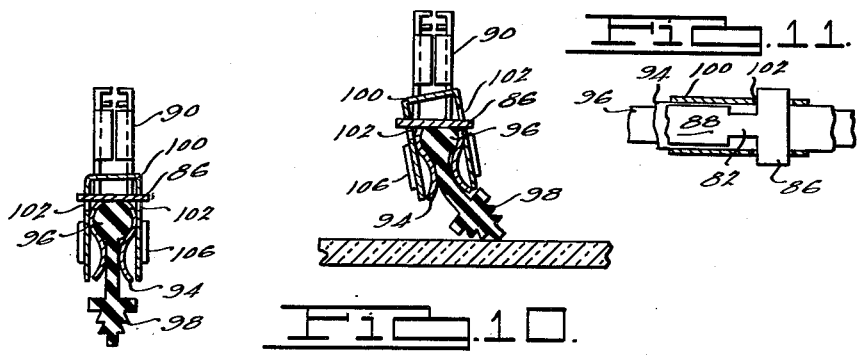

Patented Feb. 2, 1954

2,667,657

UNITED STATES PATENT OFFICE 2,667,657

WINDSHIELD WIPER

Emil E. Sivacek, Ann Arbor, Mich., assignor to King-Seeley Corporation, Ann Arbor, Mich., a corporation of Michigan Application April 21, 1947, Serial No. 742,814

7 Claims. (Cl. 15—250)

The present invention relates to windshield wiper mechanisms and more particularly to improved means for connecting wiper blades to associated wiper operating arms.

The principal objects of the present invention are to provide an arm to blade connecting means of the above generally indicated type which are simple in arrangement, economical of manufacture and assembly, and which are reliable and efficient in operation; to provide improved connecting means which are free of objectionable noise and rattle; and to provide improved connecting means which are effective to permit the wiping element to assume most efficient wiping position.

With the above as well as other objects in view, which appear in the following description and in the appended claims, preferred but illustrative embodiments of the invention are shown in the accompanying drawings, throughout the several views of which corresponding reference characters are used to designate corresponding parts, and wherein:

Figure 1 is a view in side elevation showing a windshield wiper arm connected to a wiper blade by connecting means embodying the present invention;

Fig. 2 is a view of the wiper blade and connector of Fig. 1.

Fig. 3 is a view in transverse section taken along the line 3—3 in Fig. 2;

Fig. 4 is a view in transverse section taken along the line 4—4 of Fig. 1.

Fig. 5 is an exploded view of the structure shown in Fig. 2.

Fig. 6 is a view in side elevation of a modification of the invention showing a part of the saddle removed;

Fig. 7 is a view in transverse section taken along the line 7—7 of Fig. 6;

Fig. 8 is a view in side elevation of another modification of the invention, showing a part of the saddle broken away;

Fig. 9 is a view in transverse section taken along the line 9—9 of Fig. 8;

Fig. 10 is a view in vertical transverse section of the structure illustrated in Figs. 8 and 9, showing the relative position of the parts during the wiping operation; and Fig. 11 is a partial view in horizontal transverse section taken along the line 11—11 of Fig. 8.

Referring first to Figs. 1-5 of the drawings, the improved connector 10 serves to provide a releasable connection between a wiper arm 34 and its associated wiper blade 11. The wiper blade 11 comprises a usual flexible and resilient wiper strip having a stepped wiping edge 12 along one edge of a relatively narrow rib-like body 14. The other edge of body 14 is enlarged to define a bead 15. The wiping strip is frictionally gripped within a channel-shaped holder 16, having centrally disposed thereof, two spaced apertures 18 and 20 through which the bead 15 is exposed.

The wiper actuating arm 34 is of a conventional construction including a reversely turned end portion providing a hook 32 and carrying adjacent said hook, a fitting 35 secured to the arm and having a pair of spaced, flat, wing portions 38 adapted to embrace the connector 10 in a manner hereinafter described.

The connector 10 comprises a clip 22 adapted for connection to the hook 32, and a saddle 40 adapted to be secured to the holder 16 and hold the clip 22 in assembled position.

More specifically, the clip 22 comprises a pair of generally parallel spaced body portions 24 and 26, which are generally rectangular as viewed in Figures 1 and 2. Body portions 24 and 26 are integrally connected throughout short portions along their lower edges, to form spaced legs 28 and 30 which extend longitudinally beyond the body portions 24 and 26. A notch 25 lies between the legs 28 and 30 and accommodates the uninterrupted and reinforcing portion 27 of the holder 16. Projecting portions extend in aligned relation from the body portions 24 and 26, and are turned inwardly toward each other into the substantially abutting relation best shown in Figure 3, and form bridges 36, 37 and 41, which cooperate with the integral leg portions 28 and 30, in maintaining the body portions 24 and 26 in properly spaced relation. Additionally, the bridges 36 and 41 define between them an opening at the top of the clip, which receives the hook 32, carried by the arm, as clearly appears in Figure 1. In order to prevent a reversed application of the arm 34 to the wiper, the bridge 41 is at a somewhat higher elevation than the bridge 36. Except for bridges 36, 37 and 41, entry into the space between the body portions 24 and 26 is unobstructed. Consequently, in assembling the arm 34 with the clip 22, the arm may be moved to the right relative to the clip, to a position permitting an end of the hook to be directed upwardly through the opening between bridges 36 and 41 and thereafter the arm 34 may be swung in a counterclockwise direction to the position shown. The just-mentioned assembling movement brings the wings 38 into the embracing relation shown in Figures 1 and 4, it being noted that the spacing between the wings 38 in relation to the width of the clip 22, is preferably such that, allowing for ordinary manufacturing tolerances, while arm 34 can be freely swung, in the plane of the drawing (Figure 1) relative to the clip, little or no flopping of the clip, in a direction normal to the plane of the drawing, is permitted. With this preferred relation all flopping movement of the blade relative to the arm, takes place between the clip 22 and the blade 16. Such flopping movement is, of course, desirable, to accommodate the respectively opposite directions of movement of the blade along the glass. In previously known constructions this flopping movement has resulted in undesirable noise and rattle. This objectionable feature is eliminated in the construction of the present invention by virtue of the action of the resilient bead 15 which exerts a constant pressure against the clip 22 and thus prevents any looseness or play in the movement thereof.

It will be appreciated that, in service, the arm 34 is preferably spring urged toward the windshield and consequently that the end of the arm bears against the clip 22, causing the clip to correspondingly bear against the blade. In the present construction, the pressure of the arm causes the widened under side 33 of the hook 32 to bear upon the upper surfaces of the body portions 24 and 26.

Coming now to the improved connection between the clip 22 and the holder 16, it will be noticed that the axially spaced, arcuately shaped, leg portions 28 and 30 of the clip 22 are seated upon the rounded surface of the bead 15. The generally U-shaped saddle 40, having the upstanding legs 42, is fitted over the back of the channeled holder, and is retained in place thereon by a rivet 44 or other suitable means. Portions of the unstanding legs 42 overhang the cutout portions 18 and 20 of the holder, and the end portions of the legs 28 and 30 lie behind these overhung portions. In assembled relation, the legs 28 and 30 slightly compress the bead 15, enabling the latter to resiliently urge legs 28 and 30 into engagement with the under sides of the overhung portions of the saddle legs 42, thereby providing a silenced but pivotal connection between the clips 22 and the blade 16.

It will be noticed that the openings 18 and 20 are greater in arcuate extend than are the legs 28 and 30. Consequently, when the blade and clip are co-planar, as shown in the various figures, the side edges of the legs 28 and 30 lie in spaced relation to the marginal side edges of the openings 18 and 20. By virtue of this spacing, clip 22 can be rotated or flopped relative to the blade 16, about the axis of the bead 15, through a substantial angle at either side of the co-planar relation shown in Figures 3 and 4. In the present construction also, while the rubber surface of the bead lightly and frictionally opposes such pivotal or flopping movement, it does not bias the blade and clip to any particular relative positioning. Consequently, the clip and blade remain in any relative positioning to which they are moved by external forces. In service, of course, during movement of the blade in one direction relative to the glass, the clip and blade occupy one of their limiting tilted positions. During the opposite movement of the blade relative to the glass, the clip and blade occupy the opposite limiting position.

In conclusion, it is noted that the openings 18 and 20 are slightly longer than the legs 28 and 30, and the marginal ends of these openings cooperate with the ends of these legs to limit movement of the clip lengthwise of the blade 16.

In the modified construction illustrated in Figs. 6 and 7, a wiper blade 52 similar to the wiper blade 11 has a bead 58 corresponding to the bead 15 which is carried by a holder 54 differing from the holder 16 in that it is formed to provide a single large opening 56 exposing a portion of the bead 58. The clip 60 of this modification differs from the clip 22 in that the body portions 62 and 64, corresponding to the body portions 24 and 26, are connected along the entire length of one of their longer sides to form a base 66 which is received in the aperture 56 in the holder and engages a portion of the exposed bead 58. At its opposite ends, the base 66 is provided with longitudinally extending legs 68 corresponding to the legs 28 and 30. These legs 68 extend longitudinally beyond the body portions 62 and 64 and are deformed upwardly to extend over a portion of the holder 54 in spaced relation thereto. A saddle 70, similar to the saddle 40, is fitted over and secured to the holder 54 and is provided with legs 69 which overlie the legs 68 and maintain the base 66 of the clip in engagement with the exposed bead 58.

With this construction, it will be appreciated that the previously mentioned flopping of the blade relative to the arm (not shown) also takes place between the clip 60 and the holder 54. During this flopping, the seat 66 tilts relative to the back of the bead 58, and the legs 68 tilt relative to the overhanging retaining legs 69. If desired, the co-engaging surfaces of legs 68 and 69 may be similarly rounded, and the surface 66 may be rounded to conform to the shape of the bead 58, in which event, as in the first embodiment, the clip freely occupies any flopped position to which it is moved by the application of external force. As illustrated, however, the surfaces 66, 68 and 69 are flat. With this relation, a flopping action causes a slight downward movement of the clip 60 relative to the holder 54, thereby slightly compressing the bead 58, and enabling it to lightly urge the clip and holder to the co-planar positioned relation shown in Figures 6 and 7.

In all other respects except those noted, the constructions of Figures 6 and 7 as well as the operation thereof, may be and preferably are as described with reference to Figures 1 through 5.

A further modification of the invention is illustrated in Figs. 8–11. This modification also includes means producing an automatic righting action causing the wiper blade to tend to assume a central position in which the wiper blade and the clip are coplanar. The clip 90 of this embodiment differs from the clip 60 illustrated in Figs. 6 and 7, in that its longitudinally extending legs 80 and 82 are disposed in the plane of the base 88 and are provided at their outer ends with opposed, laterally extending, portions 84 and 86. The holder 94 corresponds to the holder 54, but is provided with an aperture 96 proportioned to permit engagement between the clip 90 and the bead 96 of the wiper blade 98, along the entire length of the base 88 and the legs 80 and 82.

A saddle 100, corresponding to the saddle 70, is provided with two pairs of opposed apertures 102 adapted to receive the laterally extending portions 84 and 86 of the legs 80 and 82. The apertures 102 in the saddle are substantially larger than the laterally extending portions 84 and 86 which they receive, thereby permitting relative flopping between the clip 90 and the saddle 100. The saddle is secured to the wiper blade holder 94 and blade 98 by the rivets 104 and 106.

The parts tend to occupy the free position shown in Figs. 8 and 9 in which the saddle 100 engages the laterally extending portions 84 and 86 received through the apertures 102, to maintain the base 88 and the legs 80 and 82 in slightly compressive engagement with the bead 96 of the wiper blade. As the wiper blade 98 moves in one direction for example, to the left as viewed in Fig. 10, the pressure of the arm (not shown) causes the blade and clip to occupy the flopped position shown in Fig. 10. A limit to this flopping movement is afforded by the engagement between the leg portions 84 and 86 and the marginal edges of openings 102. It will be understood that as the saddle tilts from the position illustrated in Fig. 9, to that illustrated in Fig. 10, the bead 96 of the flexible wiper blade is increasingly compressed. Because of the resilient character of the material of the wiper blade bead, this compression develops a force within the bead acting against the clip and tending to return the saddle and wiper blade to the central aligned position illustrated in Fig. 9.

The assembly of all of the above embodiments of the invention is generally the same. The holder is first secured about the bead of the wiper blade; secondly, the clip is placed in position in engagement with the exposed bead of the wiper blade; and thirdly, with the clip in this position, the saddle is passed over the body portion of the clip and snapped onto the holder in position to engage the outwardly extending legs on the clip and maintain the clip in engagement with the bead. The connection of the wiper blade to the wiper actuating arm is completed by connecting the clip to hooked end of the arm as described above. In assembling the embodiment illustrated in Figs. 8–11, it is necessary in carrying out the third step to spread the saddle sufficiently to insert the laterally extending portions of the legs into the cooperating apertures formed in the saddle, and then close the clip to the position illustrated in the drawings.

Although only several specific embodiments of the invention have been illustrated and described in detail, it will be apparent to those skilled in the art that various changes in the form, number and arrangement of the parts may be made without departing from the spirit of the invention and from the scope of the appended claims.

What is claimed is:

1. In a windshield wiper mechanism, a wiper blade having a resilient longitudinally extending marginal portion, a channel member received over said marginal portion and apertured to expose said portion, a clip pivotally connected to said blade and adapted for connection to an associated wiper actuating arm, said clip including spaced legs engaging an exposed part of said marginal portion of said wiper blade, and a saddle secured to said member in fixed relation thereto and having spaced leg portions engaging said spaced legs to maintain said clip in engagement with said marginal portion of said wiper blade.

2. In a windshield wiper mechanism, a wiper blade having a resilient longitudinally extending marginal portion, a channel member received over said marginal portion and apertured to expose said portion, a clip pivotally connected to said blade and adapted for connection to an associated wiper actuating arm, said clip directly engaging said resilient marginal portion of said wiper blade and including spaced legs, and a saddle secured to said member in fixed relation thereto and engaging said spaced legs to maintain said clip in engagement with said wiper blade.

3. In a windshield wiper mechanism, a wiper blade having a resilient longitudinally extending marginal portion, a channel member received over said marginal portion and apertured to expose said portion, a clip pivotally connected to said blade and adapted for connection to an associated wiper actuating arm, said clip having a pair of spaced legs and a base portion disposed intermediate said legs and engaging an exposed portion of said marginal portion of said wiper blade, said legs extending along and overlying said channel member, and means secured to said member and engaging said legs to maintain said base portion of said clip in engagement with said marginal portion of said blade.

4. In a windshield wiper mechanism, a wiper blade having a resilient longitudinally extending marginal portion, a channel member received over said marginal portion and apertured to expose said portion, a clip pivotally connected to said blade and adapted for connection to an associated wiper actuating arm, said clip directly engaging said resilient marginal portion and having a pair of longitudinally extending spaced legs having laterally extending portions formed thereon, a saddle secured to said member and having apertures formed therein receiving said laterally extending portions of said legs, said saddle engaging said laterally extending portions to maintain said clip in engagement with said resilient marginal portion of said wiper blade.

5. In a windshield wiper mechanism, a wiper blade having a resilient longitudinally extending marginal portion, a channeled member received over said marginal portion and apertured to expose said portion, a clip pivotally connected to said blade and adapted for connection to an associated wiper actuating arm, said clip having a pair of longitudinally extending spaced legs engaging said resilient marginal portion and having laterally extending portions, and a saddle secured to said member and having apertures therein receiving said laterally extending portions of said legs, said saddle engaging said laterally extending portions to maintain said legs in engagement with said resilient marginal portion, the construction and arrangement of said legs, said member, said clip and said saddle being such that said blade is biased toward the position in which it is coplanar with said clip.

6. In a windshield wiper mechanism, a wiper blade assembly including a wiper blade, a longitudinally extending channel member secured to said blade, a connector element secured to said blade for pivotal movement relative thereto in a plane perpendicular thereto, said connector element having a pair of spaced flat body portions integrally connected at their lower edges, said body portions being adapted to receive therebetween cooperating attaching means on an associated wiper actuating arm and cooperate therewith to connect said wiper assembly to said arm, and means on said body portions for preventing a reverse connection of said wiper blade assembly to said arm.

7. In a windshield wiper mechanism, a wiper blade assembly including a wiper blade, a longitudinally extending channel member secured to said blade, a connector element secured to said blade for pivotal movement relative thereto in a plane perpendicular thereto, said connector element having a pair of spaced flat body portions integrally connected at their lower edges, said body portions being adapted to receive therebetween cooperating attaching means on an associated wiper actuating arm and cooperate therewith to connect said wiper assembly to said arm, and means on said body portions for preventing a reverse connection of said wiper blade assembly to said arm, said last named means comprising cooperating opposed projections on said body portions adapted to engage said arm to prevent pivoting of said wiper blade assembly to its normal operative relation to said arm when said wiper blade is reversed relative to said arm.

EMIL E. SIVACEK.

References Cited in the file of this patent

UNITED STATES PATENTS

| Number | Name | Date |
| --- | --- | --- |
| 1,786,457 | Sarver | Dec. 30, 1930 |
| 2,147,113 | Smulski | Feb. 14, 1939 |
| 2,274,277 | Rousseau et al. | Feb. 24, 1942 |
| 2,284,823 | Horton | June 2, 1942 |
| 2,310,751 | Scinta | Feb. 9, 1943 |